United States Patent
Beesley et al.

(10) Patent No.: US 6,983,377 B1
(45) Date of Patent: Jan. 3, 2006

(54) METHOD FOR CHECKING USER ACCESS

(75) Inventors: Neil Beesley, Issaquah, WA (US); Dietmar Gaertner, Ober-Ramstadt (DE); James Holme, Bickenbach (DE); Terence Kennedy, Darmstadt (DE); Dieter Kessler, Weiterstadt (DE); Thomas Vogler, Darmstadt (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 09/448,991

(22) Filed: Nov. 24, 1999

(30) Foreign Application Priority Data

Mar. 8, 1999 (EP) .................................. 99103951

(51) Int. Cl.
*H04L 9/32* (2006.01)
(52) U.S. Cl. ...................... 713/201; 713/155; 713/159; 713/162; 713/164; 713/187; 709/229
(58) Field of Classification Search ................ 713/201, 713/155, 159, 162, 164, 187; 709/229
See application file for complete search history.

(56) References Cited

U.S. PATENT DOCUMENTS

| | | | |
|---|---|---|---|
| 5,349,643 A | * 9/1994 | Cox et al. .................... | 713/155 |
| 5,586,260 A | 12/1996 | Hu ........................... | 395/200.2 |
| 5,590,199 A | * 12/1996 | Krajewski, Jr. et al. ..... | 713/159 |
| 5,684,950 A | 11/1997 | Dare et al. ............. | 395/187.01 |
| 5,872,917 A | 2/1999 | Hellmann ............... | 315/188.01 |
| 5,903,732 A | * 5/1999 | Reed et al. ................. | 709/229 |

* cited by examiner

*Primary Examiner*—Ayaz Sheikh
*Assistant Examiner*—Taghi T. Arani
(74) *Attorney, Agent, or Firm*—Davidson, Davidson & Kappel, LLC (57) ABSTRACT

A trusted agent for enabling the check of the access of a user operating a first computer system controlled by a first security system to software and/or data on a second computer system controlled by a second security system. The trusted agent includes several functions, including: (a) reception of a user-id for the second computer system and transmission of the user-id to the second security system; (b) retrieval of a shared secret, which is registered in the fist security system and in the second security system, from the second security system; and (3) transmission of the shared secret from the trusted agent to the second computer system.

13 Claims, 5 Drawing Sheets

METHOD FOR CHECKING USER ACCESS

BACKGROUND OF THE INVENTION

The present invention relates to a method of checking the access of a user operating a first computer system which is access controlled by a first security system to software and/or data on a second computer system which is access controlled by a second security system.

In many instances software applications and data shall be used across platforms. The wider and more heterogeneous availability of applications brings associated problems of authentication and authorisation, i.e. access control. In a distributed computer network the user access to a computer system is regularly controlled by an authentication and authorisation process, wherein the authentication refers to the identity of the user, while the authorisation regards the user's actual rights of access. The authentication is generally effected at the user's point of entry by comparing the user's alleged identity, regularly given with his application for access, with the user's actual identity concluded from the given user individual password. The authorisation of the user results from checking a list of permissions, which is registered in the computer's security system and which is, for example, exclusively accessible for system administrators, for the accuracy of the user's alleged or desired access permissions. This authentication and authorisation process follows different standards, depending on the software system used on the computer. Known solutions include SAF (Security Access Facility) on IBM Mainframes (RACF, ACF2), Kerberos for UNIX and NTLM (NT LAN Manager) under Windows NT. Therefore, a user, who is working on a first computer system, the access to which is controlled by a first security system, may access software and/or data on a second computer system, the access to which is controlled by a second security system, only after being accepted by the second security system, which again performs an authentication and authorisation process. That means the user must apply to the second security system with a password and repeat the verification procedure regarding his identity and his rights of access. This is burdensome and time consuming. However, the direct communication between different security systems is generally not possible due to different formats of data processing and decision making within these security systems. Nevertheless, there is an ever growing need to access remote information or software quickly and easily without giving up the necessary access control. In so called single-sign-on solutions this disadvantage is avoided by passing the user password on from the first computer system to the second computer system.

SUMMARY OF THE INVENTION

While this solution is convenient to the user it gives rise to significant security concerns, since the user password is passed to other computer systems without the desirable control by the user. Therefore, these solutions are generally discarded by the person skilled in the art if security is of particular concern.

Therefore, the problem underlying the present invention is to provide a method or tool which allows a user operating on a first computer system to which he has been granted access by a first security system to access remote software and/or data on a second computer system which is access controlled by a second security system which is different from the first security system in a form and to an extent that the direct communication between the first and the second computer system or the corresponding security systems is not feasible. These differences may be caused by different client/server configurations and mainframe architectures as well as by heterogeneous networks reflecting this different structure.

This problem is solved by a method for controlling the access of a user operating a first computer system under a first security system to software and/or data on a second computer system operating under a second security system comprising the following steps:

a) Transmitting a user-id from said first computer system to said second computer system and a challenge from said second computer system to said first computer system. This user-id and challenge may have the format common for user-ids and challenges in known security systems.

b) Transmitting said user-id and said challenge from said first computer system to said first security system. The transmission may be effected in any common or convenient way.

c) Transmitting said user-id from said second computer system to a trusted agent and from said trusted agent to said second security system. The trusted agent is a piece of software which is installed inside or outside the second computer system.

d) Transmitting a shared secret, which is registered in said first security system and in said second security system, from said second security system to said trusted agent and from said trusted agent to said second computer system.

e) Calculating in said first security system a first response using said shared secret, f) Calculating in an access control unit of said second computer system, which access control unit is able to apply the rules of the first security system for calculating a response to a challenge, a second response to said challenge by using said shared secret.

The shared secret is registered, before the beginning of any communication across the different security systems, in the first security system and second security system, therefore it is shared by the two security systems. The shared secret may be any secret piece of data, preferably a user individual value. Even more preferably the shared secret is a hashed value of a password of a user, that means the result of a password which was subjected to a hash function, i.e. a one-way function which is comparably easy to carry out, but is virtually impossible to invert so that the password cannot be determined from the hashed value even when knowing the hash function.

The second response is calculated in an access control unit of the second computer system, which is controlled by the second security system. It may operate, for example, under OS/390, whereas the first computer system and the first security system may, for example, operate under Windows NT. For calculating the second response the access control unit needs to be able to apply the rules of the first security system for calculating a response to a challenge. This access control unit is, for example, a DCOM security system of the applicant or any other manufacturer, which applies the rules of the first security system operating under Windows NT, but runs in the OS/390 environment of the second computer system and the second security system. The calculation of the second response in the access control unit of the second computer system necessitates the knowledge of the shared secret stored in the second security system. Since a direct communication of the access control unit with the second security system is not possible, due to different operating structures, the shared secret is retrieved by said trusted agent. The trusted agent is trusted by the second security system and can communicate with both the access control unit and the second security system.

The trusted agent preferably comprises two halves, one half for communication with the second computer system, the other half for communication with the second security system. The latter half may use standard, published interface calls. It need not contain any secrets, therefore its source code may be examined by a system administrator.

A. The method of the present invention may further include
    g) Transmitting said first response from said first security system to said first computer system.
    h) Transmitting said first response to said second computer system and comparing said first response and said second response in the second computer system in order to complete the access check of said user. The second computer system compares the second response with the first response given by the first computer system. If they are identical the user is identified. If this is not the case, the user is denied access to the second computer system. After correct identification the authorization checks can then be performed. Thus the user may finally be authorized to access the second computer system and its information, which may be software applications, database or any other information.

In the scope of the present invention the first computer system may be a stand-alone device which is temporarily connected to a network, or it may be a permanent element of a computer network. Frequently, the first computer system comprises a client. The second computer system may be or comprise any computer device, including but not limited to a personal computer and a mainframe. However, the assembly may also be used in reverse, i.e. the first computer system comprises a mainframe or server and the second computer system comprises a stand-alone computer or the like. The two computer systems are preferably linked by a WAN or a LAN, but may be temporarily or permanently linked by every other suitable connection. It is preferred that they communicate via secure channels. Secure channels are lines of connection for data transmission which do not allow the recording of the transmitted data and the resending of this data thereby impersonating one of the partners of the communication. It is not requested that the secure channel may not be read from outside. For example, the Secure Socket Layer (SSL) protocol can be used for providing secure channels.

The first and second security systems are systems which control the access of users to the first and second computer system, respectively. They may be integrated into the corresponding computer system or as well be external devices. Frequently they are arranged at a central location within a network and controlled by the system administrators of the computer network.

Preferably, the authentication of the user is effected only in the first security system, i.e. at the user point of entry, while the authorization takes place in the second security system, i.e. at the point of execution of the distributed services. This avoids the need for multiple sign-ons to the different security systems. The result of the authentication is propagated for use in the authorization process in the second computer system without the need to pass a user password at the time of execution of the remote access to the second computer system. No footprint, that means no particular software, is necessary on the first computer system to achieve the authentication process.

The authorization is performed in the second security system, i.e. at the time of execution of the desired software application or data use. The authorization rules are stored in the second security system. Therefore, the existing security systems remain in action and their benefits can be enjoyed further on, like tight integration in the respective operating system.

These operations are carried out without any participation of the user and without any problems being caused by differences of the two security systems or of the operating systems of the two computer systems. The trusted agent allows with the help of a secret shared among the two security systems the indirect communication of the two security systems which, due to their differences, cannot communicate directly with each other. The trusted agent is internally structured in a way as to allow for its communication with the second security system of the remote computer system, particularly a server, as well as with the first computer system which is governed by the first security system. This communication of the trusted agent need not, but may be direct.

The shared secret may be established in the two security systems by the following steps:
    a) Calculating the shared secret from a password of the user by subjecting said password to a secret function. This secret function may be any suitable function, that means any function which is sufficiently secure and which is not too easy to invert. It may be, for example, a hash function.
    b) Registering said shared secret in the first security system, so that it may serve as a reference for verifying the user's authorization and, if desired, identity.
    c) Calculating an encrypted value of the shared secret by subjecting said shared secret to an encryption function. Again, any convenient and sufficiently secure encryption code may be used.
    d) Transmitting to the trusted agent and further to said second security system said encrypted value of the shared secret. The encryption was made in order to protect this transmission of the shared secret from the first to the second computer. If for this transmission the security standard achieved by encryption is, for any reason, not requested the encryption and later decryption of the shared secret may be left away.
    e) Retrieving the shared secret in the second security system by decrypting the encrypted shared secret value.
    f) Registering the shared secret in the second security system. Thereby, also the second computer system has, via the trusted agent, the necessary reference for the authentication process.

This initialization process may be carried out only once when the user signs up to certain services or access possibilities. However, it may also, for security reasons, be done at the beginning of every session or at certain time intervals also during running sessions.

In the scope of the present invention also a trusted agent is provided for enabling the check of the access of a user operating a first computer system controlled by a first security system to software and/or data on a second computer system controlled by a second security system. This trusted agent comprises at least the following functions, which may be realized in hardware or in software:
    a) Reception of a user-id from said second computer system and transmission of said user-id to said second security system.

b) Retrieval of a shared secret, which is registered in the first security system and in the second security system, from the second security system.

c) Transmission of said shared secret from the trusted agent to the second computer system.

Preferably, the first computer system is operated in this context under Windows NT and the second computer system is operated under OS/390. The access control unit of the second computer system then applies the rules of the Windows NT security protocol, which are also applied, in this example, by the first security system.

All computations, transmissions, authentications, receptions, conversions, encryptions, registrations, etc., are carried out, preferably automatically, and in one or more digital computers or computer systems. The preferred realization of the trusted agent is also in a digital computer.

BRIEF DESCRIPTION OF THE DRAWINGS

The invention is in the following exemplary described with reference to of the following drawings, which show.

DETAILED DESCRIPTION

Figure 1:
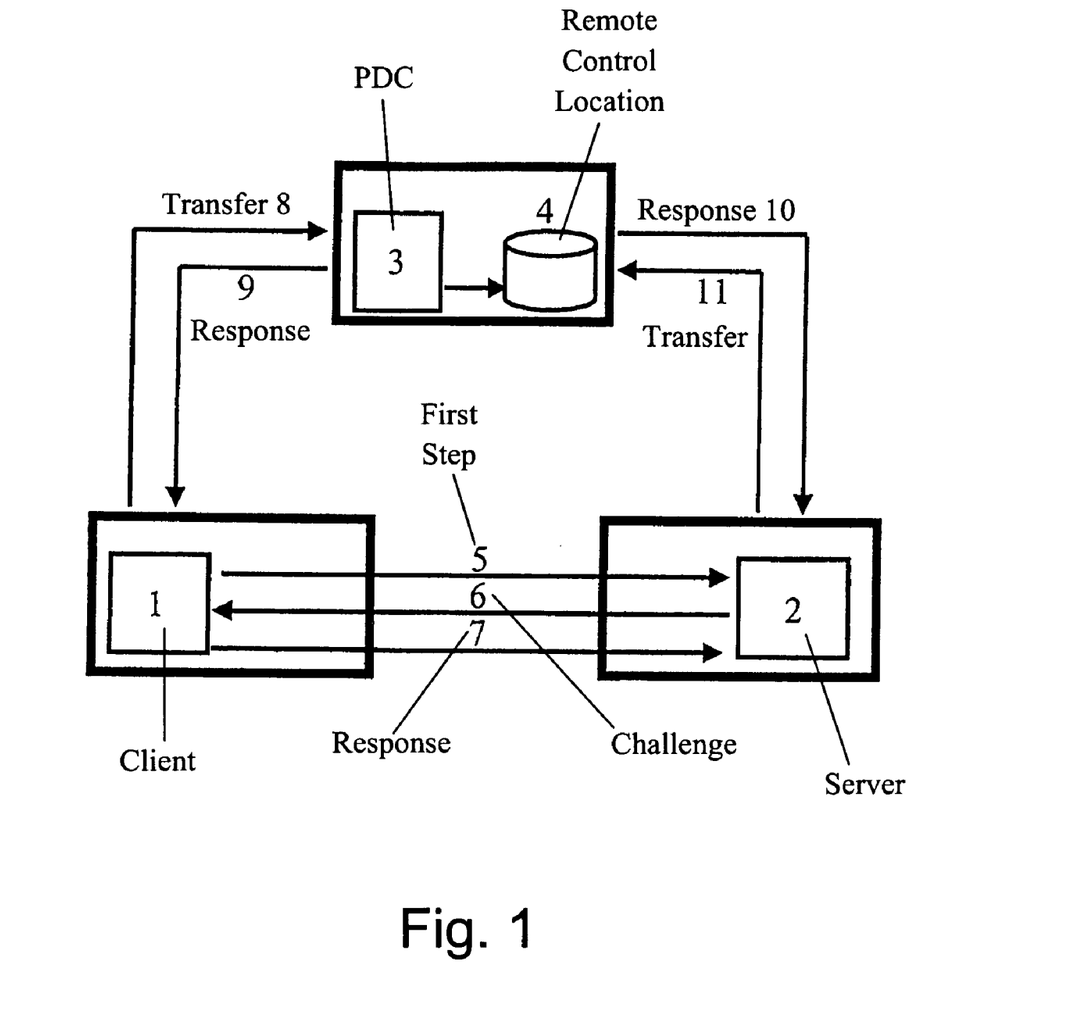
FIG. 1: Prior art DCOM security model on Windows NT.

FIG. 1 shows the principle of the Distributed Component Object Model (DCOM) security concept as it is implemented by the company Microsoft in its system Windows NT. When a user, who works on a first computer system 1 (client), wants to access information, for example software or database information, on a second computer system 2 (server) he has to go through an authentication and authorisation process which is carried out under Windows NT, the operating system for the client 1 and the server 2. In a first step, represented by the arrow 5, the client 1 sends a user-id, domain name and node to the server 2, which responds with a challenge, represented by arrow 6. This challenge is passed, together with the user-id of the applying user, to the Primary Domain Controller (PDC) 3, which in this example is installed in the remote control location 4. This transfer is independently done by the client 1 to PDC 3, shown by arrow 8, and by server 2 to PDC 3, shown by arrow 11. The PDC 3 then calculates the response to the user-id and the challenge by using the hash value of a user individual password, i.e. the value which is received from subjecting a user individual password to a hash function. As explained earlier, a hash function is understood to be a one-way function, that means it may be applied in one direction without any problems, but it is virtually impossible to invert. The response is then transmitted to the client 1 and to the server 2, shown by arrows 9 and 10, respectively. Together with the response a session key is transmitted, which is session individual in order to render it more difficult to figure the system out. Finally, the client 1 transfers the response 7 to the server 2, thereby proving his identity and authorisation.

Figure 2:
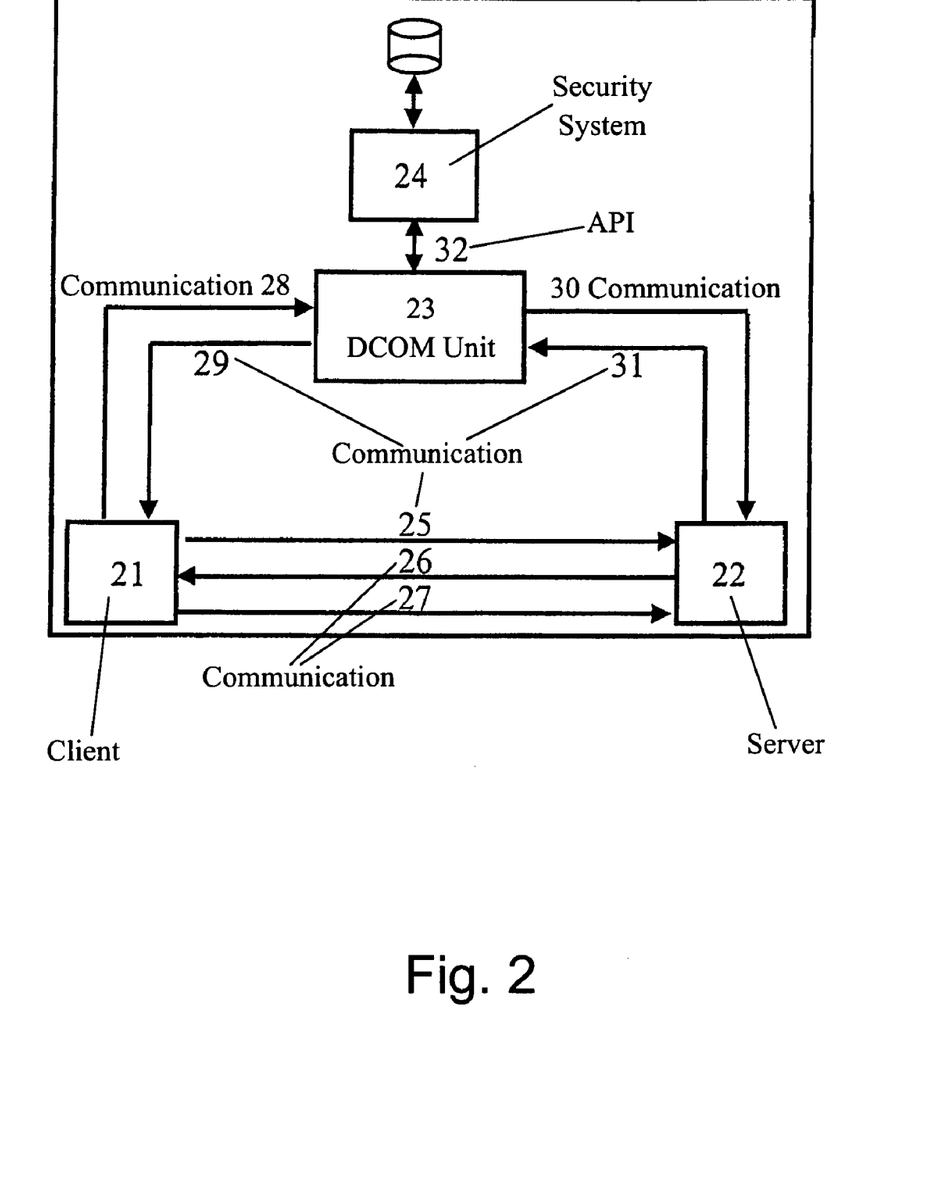
FIG. 2: Prior art DCOM security model on IBM OS/390.

FIG. 2 shows the implementation of a DCOM security concept by the applicant, implemented to work in an IBM OS/390 environment. The basic structure of this concept is similar to the above described Microsoft concept. However, the functions of the PDC are replaced by the DCOM implementation. Here, a user operating a client 21 contacts a server 22, both running under OS/390. By communication 25 the client 21 sends his user-id, which may represent an individual or a job, and requests access to the server 22. With communication 26 the server 22 answers the request for access with a challenge. Both, the client 21 and the server 22 pass the user-id and the challenge to the DCOM unit 23, by communications illustrated by arrows 28 and 31, respectively. The DCOM unit 23 communicates via the Security Authorisation Facility (SAF) 32 with the security system 24, for example RACF, ACF/2 or TopSecret. The SAF 32 is an Application Program Interface (API) which conditionally directs control to the security system 24 when receiving a request from a resource manager. The security system 24 provides the DCOM unit 23 with password information so that the latter is enabled to calculate the response to the user-id and challenge. This response is, together with a session key, sent back to the client 21 and the server 22 by communications represented by the arrows 29 and 30, respectively. Finally, the client passes the response by communication 27 to the server 22, which accordingly allows or denies the access of the client 21.

The security systems described in FIGS. 1 and 2 are not compatible insofar as they cannot communicate directly with each other, due to their essentially different structure. For example, a DCOM object server executing in OS/390 is not able to determine the correct response and session key for a remote client on Windows NT. They cannot, either directly or indirectly, communicate with a remote PDC, since no such API exists. But even if a mechanism could be implemented to enable PDC access from non-Windows systems it would be undesirable to most customers, since it is highly impractical during execution of mission critical applications for performance reasons that mainframe services should continually reference a remote Windows PDC before allowing access to DCOM objects which are executing on the same OS/390. The more fundamental problem, however, is that the two computer systems, the client and the server, run under different security systems so that the security information is not kept in the same system. In order to give one security system access to the secret information stored in the other security system the secret information would have to be transferred between the two security systems, which significantly affects the whole security concept. The method and system according to the present invention is able to avoid this problem.

Figure 3:
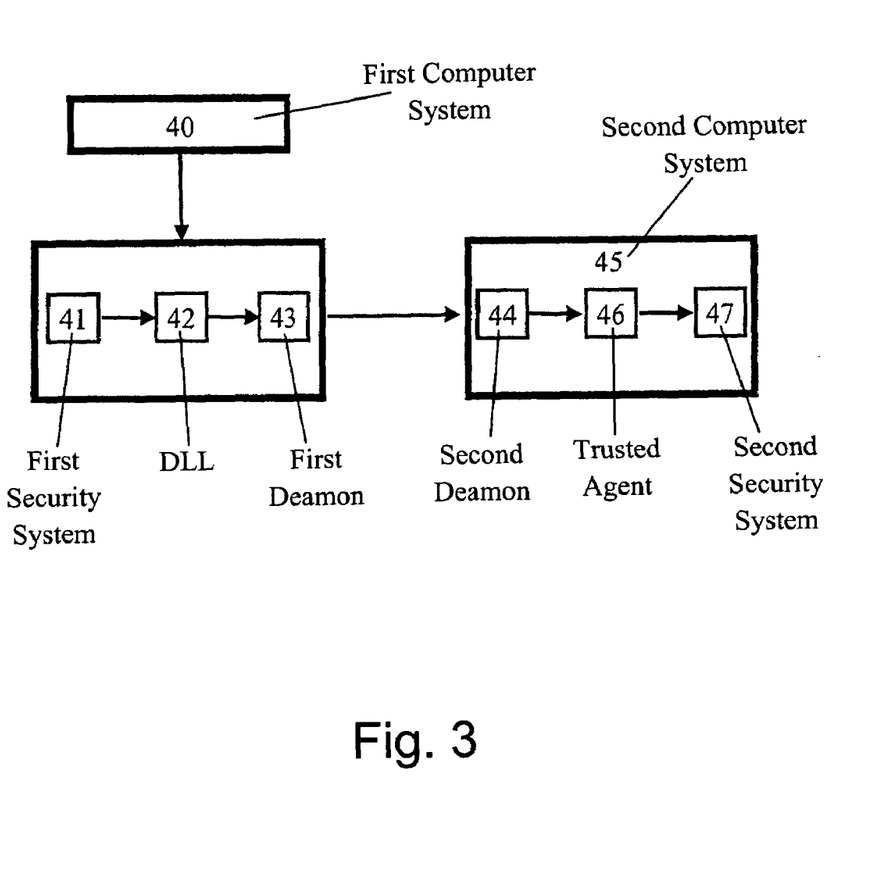
FIG. 3: Installation of a shared secret according to the present invention.

FIG. 3 shows the initialisation step for the inventive method, the installation of a shared secret among the two different security systems, for example the Windows NT and the OS/390 security systems. The client in this case is a first computer system 40, for example a NT Workstation. If the user enters or changes a password for his access to the first computer system, the client 40, the password or the password change, respectively, will be communicated to the first security system 41 which is responsible for the first computer system 40. The security system 41 may, for example, be a PDC of a Windows NT system, as described above. It is connected to a password change Dynamic Link Library (DLL) 42. DLL 42 is itself connected to a first deamon 43. In the context of this invention a deamon is a process that listens continually for incoming communications and which is arranged at a dedicated port. In case of a password change the changed password or the difference between the old and the new password will be communicated by the first security system 41 to the DLL 42, which catches it and passes it on to the first deamon 43. This deamon 43 calculates a secure value of the password or password change by subjecting them to a function, e.g. a hash function, and subsequently transmits the secure value together with the user-id of the user to the second deamon 44 located on the second computer system 45, e.g. a server running under OS/390. The deamon 44 passes the secure value and the user-id on to a trusted agent 46 which then updates the second security system 47, e.g. RACF for OS/390. Herewith, both the first security system 41 and the second security system 47 know the secure value, which represents the new password or the password change, which is therefore considered to be a shared secret. It may be noted that the trusted agent 46 need not be installed inside the second computer system 45, it could also be remotely located, for example at some administratively advantageous position.

In FIG. 3, the transmission of the shared secret from the first deamon 43 to the second deamon 44 may be made more secure if the shared secret, i.e. the password hash is encrypted before sending it. The decryption may then take place somewhere in the second computer system, preferably in the second security system 47, which is the final recipient of the shared secret on the side of the second computer system 45.

Figure 4:
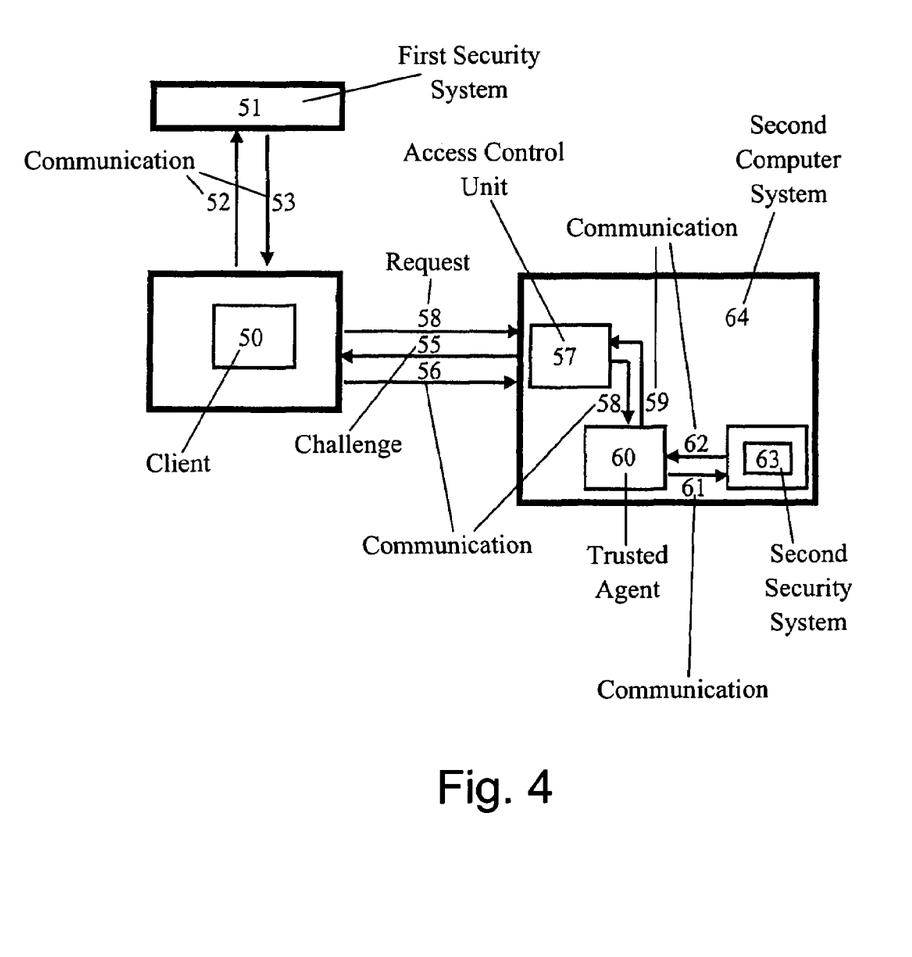
FIG. 4: Method of access control according to the present invention.

FIG. 4 shows an embodiment according to the present invention. A client 50 operating under a first security system 51, e.g. a NT workstation 50 operating under the control of PDC 51. The client 50 sends a request 58, comprising at least of a user-id, if necessary also of a domain name and a node, to the second computer system 64, preferably a server. The access control unit 57, e.g. a DCOM security system on OS/390 as described with FIG. 2 above, in the second computer system 64, running in this example under OS/390, answers with a challenge 55. The first computer system 50 then passes the user-id and the challenge on to the first security system 51 by communication 52. The first security system 51 answers with the return of a first response and, regularly, a session key by communication 53. This first response is calculated using of a shared secret registered in the first security system 51. The access control unit 57 passes the user-id on to trusted agent 60 by communication 58. The trusted agent 60 then transfers the user-id to the second security system 63, e.g. a RALF for OS/390 via communication 61. This second security system 63 returns the shared secret to the trusted agent 60 via communication 62 which passes it on to the access control unit 57 via communication 59, thereby enabling the latter to calculate a second response and, if required, the session key. The access control unit 57 is able to apply the same rules for calculating a response to a challenge as the first security system 51. Finally, the first computer system 50 passes its first response by communication 56 to the access control unit 57 of the second computer system 64 which compares it with the second response obtained from the trusted agent 60. If the first and second responses are identical the user or client is granted access, otherwise the access is denied.

The trusted agent 60, in the example of the second computer system running under OS/390, must obtain control in APF state, that means it executes as an authorized program. APF state means that a program was loaded from a program library that was defined as an authorized library, and the program was linkedited with AC=1. In this state it is permitted to manipulate protected MVS control blocks in ways that permit bypassing normal security controls. It can, for example, pass calls to the security system 63 on behalf of other users and can access user data. One task of the trusted agent 60 is, as described, to receive new hashed passwords and store them in the security system 63. When a new encrypted password hash is received for a specific user-id that user's security profile is updated with the new value and the status field is set appropriately. The security system 63 then has all the necessary information to allow this user access under OS/390. The other task of the trusted agent 60 is to assist in authentication by retrieving the encrypted hashed password value from the security system 63, as described above.

In the example described in FIG. 4 the trusted agent 60 may be tightly "bound" to the access control unit 57 via a dedicated communication pipe, according to the following principle: At installation time a system administrator specifies that the trusted agent, when it runs, will be started in a process with APF status. Whenever the access control unit 57 on OS/390 starts it opens a dedicated communication pipe and initiates the trusted agent process. This guarantees that only the access control unit 57 can start and communicate with the trusted agent. On the side of the second security system 63 the trusted agent 60 uses standard communication calls, e.g. SAF API calls.

The inventive method described in connection with FIG. 4 provides cross-platform interoperability between different security systems without the transfer of any user passwords during normal operation, which is always a weak point in any distributed security system. This method is non-invasive. That means, there is no impact on the user or on the security systems. That means if the user chooses to access the second computer system directly, rather than remotely through the first computer system, his SAF security profile is unaffected. Security administrators do not need to modify their security environments in any way and can continue to use existing security rules. The inventive solution may use standard APIs (Application Program Interfaces) of existing security systems. Additionally, the inventive method can be easily extended to support evolving security systems.

Figure 5:
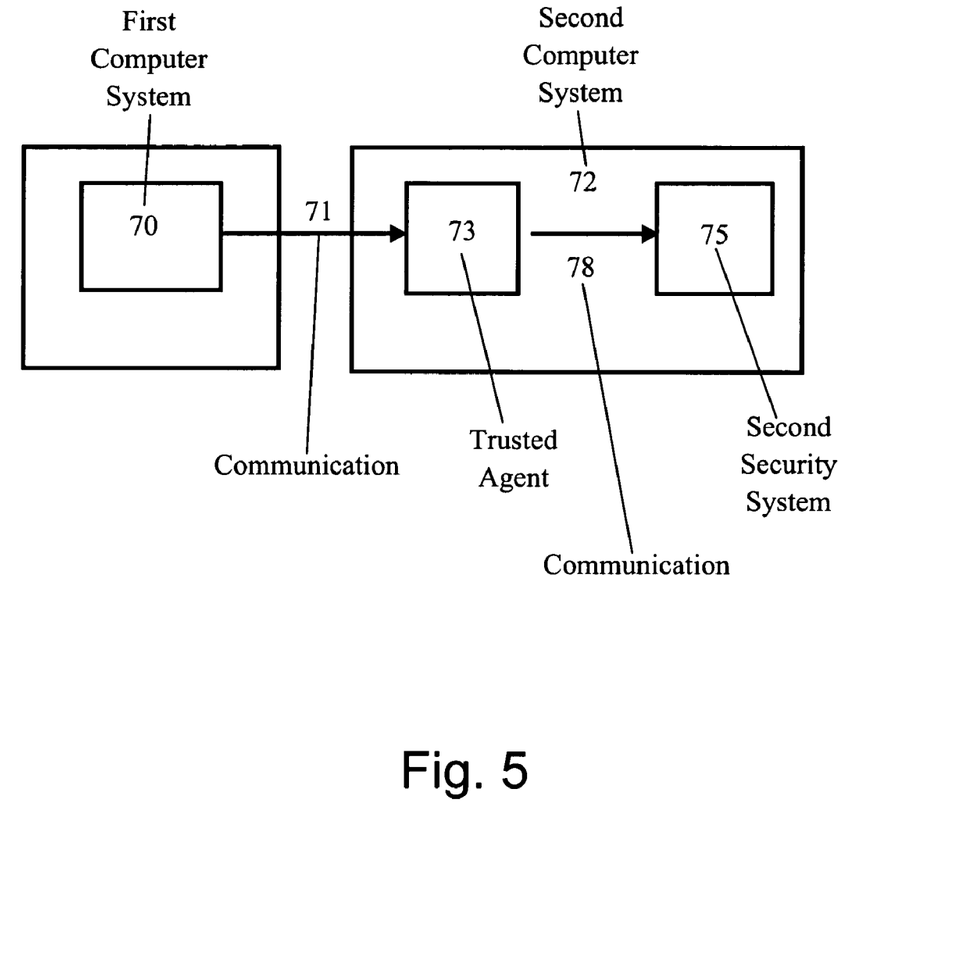
FIG. 5: Optional method of password synchronisation.

An optional feature of the inventive method, which, however, may weaken the security of the system, is the ability to automatically synchronize passwords across systems and platforms. An exemplary embodiment for this feature is shown in FIG. 5. It shows the concept of a password synchronization between two different security systems. Regularly, the different security systems use different passwords to check the access to their system. If the password of a user for his entry into a first computer system 70 running under a first security system shall be changed and this change shall be communicated via communication 71 to a second computer system 72 operating under a second, different security system 75 in order to synchronize the passwords under the two security systems, the client 70 sends the user-id, old and new password and the shared secret, e.g. the hash value, derived from the new password, all in encrypted form to the trusted agent 73. The trusted agent 73 is in communication with the second computer system 72 and may but need not be, as it is shown here, part of the second computer system 72. The trusted agent 73 decrypts the transmitted encrypted information and passes via communication 78 the new password and the shared secret calculated from the new password to the second security system 75. The result of this process is that the second security system disposes of the full information about the passwords of the first security system for the user concerned. Herewith, the communication between the security systems is rendered much easier, since any confusion resulting from the use of different passwords is avoided.

The present invention therefore provides a method and tool for facilitating the controlled access of a user of a first system to remote second systems, wherein the systems are controlled by different security systems.

The method of the present invention may be stored as a series of executable program steps located on memories or data carriers accessible to the first computer system, the second computer system, and/or the trusted agent. Processors in these systems can perform the program steps stored on the memories or data carriers. The memories or data carriers may include but are not limited to RAMs, ROMs, disks and hard disk drives.

What is claimed is:

1. A method for checking the access of a user operating a first computer system controlled by a first security system to software and/or data on a second computer system controlled by a second security system comprising the following steps:
   a) transmitting a user-id from said first computer system to said second computer system and a challenge from said second computer system to said first computer system,
   b) transmitting said user-id and said challenge from said first computer system to said first security system,
   c) transmitting said user-id from said second computer system to a trusted agent and from said trusted agent to said second security system,
   d) transmitting a shared secret, which is registered in said first security system and in said second security system, from said second security system to said trusted agent and from said trusted agent to said second computer system,
   e) calculating in said first security system a first response using said shared secret,
   f) calculating in an access control unit of said second computer system, which access control unit is able to apply the rules of the first security system to calculate a response to a challenge, a second response to said challenge using said shared secret,
   g) transmitting said first response from said first security system to said first computer system, and
   h) transmitting said first response from said first computer system to said second computer system and comparing said first response and said second response in the second computer system in order to complete the access check of said user.

2. A method according to claim 1, characterized in that the shared secret is individual to said user.

3. A method according to claim 2, characterized in that the shared secret is a hashed value of a password of said user.

4. A method according to claim 1, characterized in that the second computer system comprises a system which issues said challenge and calculates said second response according to the rules of the first security system.

5. A method according to claim 1, characterized in that the shared secret is established by the following steps:
   calculating a shared secret of a password of said user by subjecting said password to a secret function,
   registering said shared secret in said first security system controlling said first computer system,
   calculating an encrypted shared secret of said shared secret by subjecting said shared secret to an encryption function,
   transmitting said encrypted shared secret to said trusted agent and further to said second security system,
   retrieving said shared secret in said second security system by decrypting said encrypted shared secret, and
   registering said shared secret in said second security system controlling said second computer system.

6. A method according to claim 1, characterized in that the second computer system comprises a server.

7. A method according to claim 1, characterized in that the first computer system comprises a client.

8. A method according to claim 1, characterized in that the first and the second computer system are linked by a WAN or a LAN.

9. A method according to claim 1, characterized in that the first computer system is operated under Windows NT and the second computer system is operated under OS/390.

10. A method according to claim 1, characterized in that the communication between the first and the second computer system is done via secure channels.

11. A method according to claim 1, characterized in that the authentication of said user is effected in the first computer system and the authorisation of said user is effected in the second computer system.

12. A series of executable program steps stored on at least one computer readable memory, the program steps when executed by a computer system causing the computer system to perform a method for checking the access as recited in claim 1.

13. A computer readable medium with a computer program for carrying out the method according to claim 1 on a computer system.

* * * * *